United States Patent
Kelley et al.

(10) Patent No.: US 10,089,767 B2
(45) Date of Patent: *Oct. 2, 2018

(54) SIMPLIFIED LIGHTING COMPOSITING

(71) Applicant: International Business Machines Corporation, Armonk, NY (US)

(72) Inventors: John F. Kelley, Clarkesville, GA (US); Douglas E. Lhotka, Highlands Ranch, CO (US); Kristin S. Moore, Charleston, SC (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/164,072

(22) Filed: May 25, 2016

(65) Prior Publication Data

US 2016/0267698 A1 Sep. 15, 2016

Related U.S. Application Data

(63) Continuation of application No. 14/176,479, filed on Feb. 10, 2014, now Pat. No. 9,396,571.

(51) Int. Cl.
*G06T 15/50* (2011.01)
*G06T 11/60* (2006.01)
*G06T 7/00* (2017.01)

(52) U.S. Cl.
CPC ........... *G06T 11/60* (2013.01); *G06T 7/00* (2013.01)

(58) Field of Classification Search
CPC .............. G06T 5/50; G06T 15/50–15/87
See application file for complete search history.

(56) References Cited

U.S. PATENT DOCUMENTS

| 5,583,542 A | 12/1996 | Capps et al. |
| 5,828,793 A | 10/1998 | Mann |

(Continued)

FOREIGN PATENT DOCUMENTS

| EP | 1061407 | 12/2000 | |
| JP | 2004192469 | * 12/2002 | ............. G06T 15/04 |
| WO | 9206557 | 4/1992 | |

OTHER PUBLICATIONS

IronCAD, "Spotlight Advance Settings", 2010, http://www.ironcad.com/support/OnlineHelp/Realistic_Rendering/Spotlight_Advance_Settings.htm, pp. 1-5 (and including Goodgle search pp. 1-4).*

(Continued)

*Primary Examiner* — Jacinta M Crawford
*Assistant Examiner* — Phong Nguyen
(74) *Attorney, Agent, or Firm* — Schmeiser, Olsen & Watts; William Hartwell

(57) ABSTRACT

A method and system for processing light sources. A base photographic image of a scene is combined with N additional photographic images of the scene to form a composite image including M discrete light sources (N≥2; M≥N). The scene in the base image is exposed to ambient light. The scene of the base image is exposed, in each of the N additional images, to the ambient light and to at least one discrete light source to which the base image is not exposed. The M discrete light sources in the composite image include the discrete light sources to which the scene is exposed in the N additional images. The composite image is displayed on a display device, depicting a region surrounding each discrete light source and having an area that correlates with an intensity of light from the discrete light source surrounded by the region.

17 Claims, 15 Drawing Sheets

(56) References Cited

U.S. PATENT DOCUMENTS

| | | | |
|---|---|---|---|
| 6,078,332 A * | 6/2000 | Ohazama | G06T 15/506 345/421 |
| 6,088,470 A | 7/2000 | Camus et al. | |
| 6,956,574 B1 * | 10/2005 | Cailloux | G06T 13/80 345/467 |
| 6,995,790 B2 | 2/2006 | Higurashi et al. | |
| 7,202,867 B1 * | 4/2007 | Rodriguez | G06T 15/50 345/426 |
| 8,724,921 B2 | 5/2014 | Jin | |
| 8,964,089 B2 * | 2/2015 | Imai | G06T 5/50 348/220.1 |
| 9,001,226 B1 * | 4/2015 | Ng | H04N 5/23203 348/211.11 |
| 9,060,117 B2 | 6/2015 | Bryll et al. | |
| 9,439,272 B2 * | 9/2016 | Moore | H05B 37/029 |
| 9,483,815 B2 * | 11/2016 | Boyadzhiev | G06T 11/60 |
| 2002/0015227 A1 | 2/2002 | Hsu et al. | |
| 2002/0082081 A1 * | 6/2002 | Takeuchi | G06T 15/405 463/32 |
| 2004/0184667 A1 * | 9/2004 | Raskar | G06T 5/50 382/254 |
| 2006/0008171 A1 * | 1/2006 | Petschnigg | G06T 5/50 382/254 |
| 2006/0033835 A1 | 2/2006 | Pollard et al. | |
| 2007/0201853 A1 * | 8/2007 | Petschnigg | G03B 15/03 396/155 |
| 2008/0212870 A1 | 9/2008 | Tan et al. | |
| 2009/0257631 A1 * | 10/2009 | Baumgart | G06T 5/50 382/128 |
| 2010/0045676 A1 * | 2/2010 | Wyborn | G06T 15/50 345/426 |
| 2010/0111381 A1 * | 5/2010 | McBeth | A61B 3/135 382/128 |
| 2011/0205395 A1 | 8/2011 | Levy | |
| 2011/0234590 A1 * | 9/2011 | Jones | G06K 9/4661 345/426 |
| 2011/0273448 A1 * | 11/2011 | Geraci | G06T 15/50 345/426 |
| 2012/0008854 A1 * | 1/2012 | Shim | G06T 15/506 382/154 |
| 2012/0229475 A1 * | 9/2012 | Sheridan | G06T 13/40 345/474 |
| 2012/0314103 A1 * | 12/2012 | Majewicz | H04N 5/2354 348/239 |
| 2013/0006525 A1 * | 1/2013 | Stroila | G01C 21/20 701/434 |
| 2013/0016878 A1 * | 1/2013 | Pan | G06K 9/4652 382/103 |
| 2013/0028469 A1 | 1/2013 | Lee et al. | |
| 2013/0114894 A1 * | 5/2013 | Yadav | G06T 5/008 382/167 |
| 2013/0120636 A1 * | 5/2013 | Baer | H04N 5/2354 348/335 |
| 2013/0121567 A1 * | 5/2013 | Hadap | G06T 15/50 382/162 |
| 2014/0112548 A1 | 4/2014 | Huang et al. | |
| 2014/0218353 A1 * | 8/2014 | Solem | G06T 19/20 345/419 |
| 2014/0232719 A1 * | 8/2014 | Wahrenberg | G06T 15/506 345/424 |
| 2015/0063694 A1 | 3/2015 | Shroff et al. | |
| 2015/0228098 A1 | 8/2015 | Kelley et al. | |
| 2015/0325035 A1 * | 11/2015 | Howell | G06T 15/06 345/426 |
| 2016/0042531 A1 * | 2/2016 | Nolan | H05B 37/036 348/135 |

OTHER PUBLICATIONS

Martin Bichsel, Analyzing a Scene's Picture Set Under Varying Lighting, Computer Vision and Image Understanding, vol. 71, No. 3, Sep., pp. 271-280, 1998, Article No. IV970627, pp. 271-280.

Authors et al: SPI DST Yoshiaki Shirai, IEEE Computer Society Submitter, Image Processing for Data Capture, Original Publication Date: Nov. 1, 2982, IP.com No. IPCOM000131549D, 12 pages.

Authors et al: SPI DST, Nevatia, Ramakant, Stanford University Artificial Intelligence Laboratory, Structured Descriptions of Complex Curved Objects for Recognition and Visual Memory, Original Publication Date: Oct. 31, 1974, IP.com No. IPCOM000150595D, 130 pages.

Office Action (Aug. 31, 2015) for U.S. Appl. No. 14/176,479, filed Feb. 10, 2014, Conf. No. 2080.

Amendment (Nov. 30, 2015) for U.S. Appl. No. 14/176,479, filed Feb. 10, 2014, Conf. No. 2080.

Final Office Action (Feb. 12, 2016) for U.S. Appl. No. 14/176,479, filed Feb. 10, 2014, Conf. No. 2080.

Final amendment (Apr. 4, 2016) for U.S. Appl. No. 14/176,479, filed Feb. 10, 2014, Conf. No. 2080.

Notice of Allowance (Apr. 15, 2016) for U.S. Appl. No. 14/176,479, filed Feb. 10, 2014, Conf. No. 2080.

"Spotlight Advance Settings", IronCAD, archived by Google on Aug. 8, 2010; accessible at http://www.ironcad.com/support!OnlineHelp/Relalistic_Rendering/Spotlight_Advance_Settings.htm, pages.

* cited by examiner

SIMPLIFIED LIGHTING COMPOSITING

This application is a continuation application claiming priority to Ser. No. 14/176,479, filed Feb. 10, 2014, now U.S. Pat. No. 9,396,571 issued Jul. 19, 2016.

TECHNICAL FIELD

The present invention relates generally to processing images and, and more specifically to processing light sources found in images.

BACKGROUND

Traditional lighting techniques for photography are still in wide use. However, traditional techniques attempt to stage lighting and capture in one or two images. These techniques require large lights, and an extreme amount of timing and coordination; e.g., turning lights on and off during several seconds of exposure.

World Patent WO 1992006557-A1 discloses color image processing system for preparing a composite image transformation module for performing a plurality of selected image transformations; with composite transform definition including sample values of an input/output relation of a composite image transformation which is equivalent to the image transformation(s) selected by the user. A custom transform definition can be prepared in accordance with a user's instructions and added to the plurality of transform definitions stored by the storage device. The transform controller operates in real time, implementing the user's selections sufficiently quickly to allow the user to interact with the image processing system until a desired array of modified pixel values are obtained.

European Patent EP1061407-B1 discloses a camera used to captures images of different portions of the document. The images captured from adjacent or overlapping fields of view can be joined into a composite image of the adjacent or overlapping fields.

Bischel, M., Analyzing a Scene's Picture Set under Varying Lighting, COMPUTER VISION AND IMAGE UNDERSTANDING, Vol. 71, No. 3, September, pp. 271-280, 1998 ARTICLE NO. IV970627, discloses derivation of a description of the set of all pictures that can be taken from a given scene under varying lighting, where the camera, the scene, and the light sources are static but where each light source can vary arbitrarily in radiance. A lighting invariant recognition algorithm is introduced and tested in a face recognition experiment, which shows that lighting invariant recognition leads to considerably better performance, even if the radiance of the light sources and the lighting directions change.

Clapp (U.S. Pat. No. 4,018,519) discloses a composite photography apparatus. A background image is projected onto an auto-collimating screen along an axis generally normal to the surface of the screen, directing polarized light in a first polarized plane onto a subject in front of the screen. Light reflected from the subject and the screen is transmitted to a camera in a second polarized plane perpendicular to the first polarized plane, which prevents any of the polarized light reflected from the screen in the first polarized plane from reaching the camera.

BRIEF SUMMARY

The present invention provides a method and an associated system for processing light sources found in images. The method comprises combining, by one or more processors, a base image of a scene with N additional images of the scene to form a composite image comprising M discrete light sources, wherein the scene in the base image is exposed to ambient light, wherein the scene of the base image is exposed, in each of the N additional images, to the ambient light and to at least one discrete light source to which the base image is not exposed, wherein the M discrete light sources in the composite image include the discrete light sources to which the scene is exposed in the N additional images, wherein the base image and the N additional images are photographic images, wherein N is at least 2, and wherein M is at least N. The one or more processors display the composite image on a display device, wherein the displayed composite image depicts a region surrounding each discrete light source and having an area that correlates with an intensity of light emitted by the discrete light source

DETAILED DESCRIPTION

Figure 1:
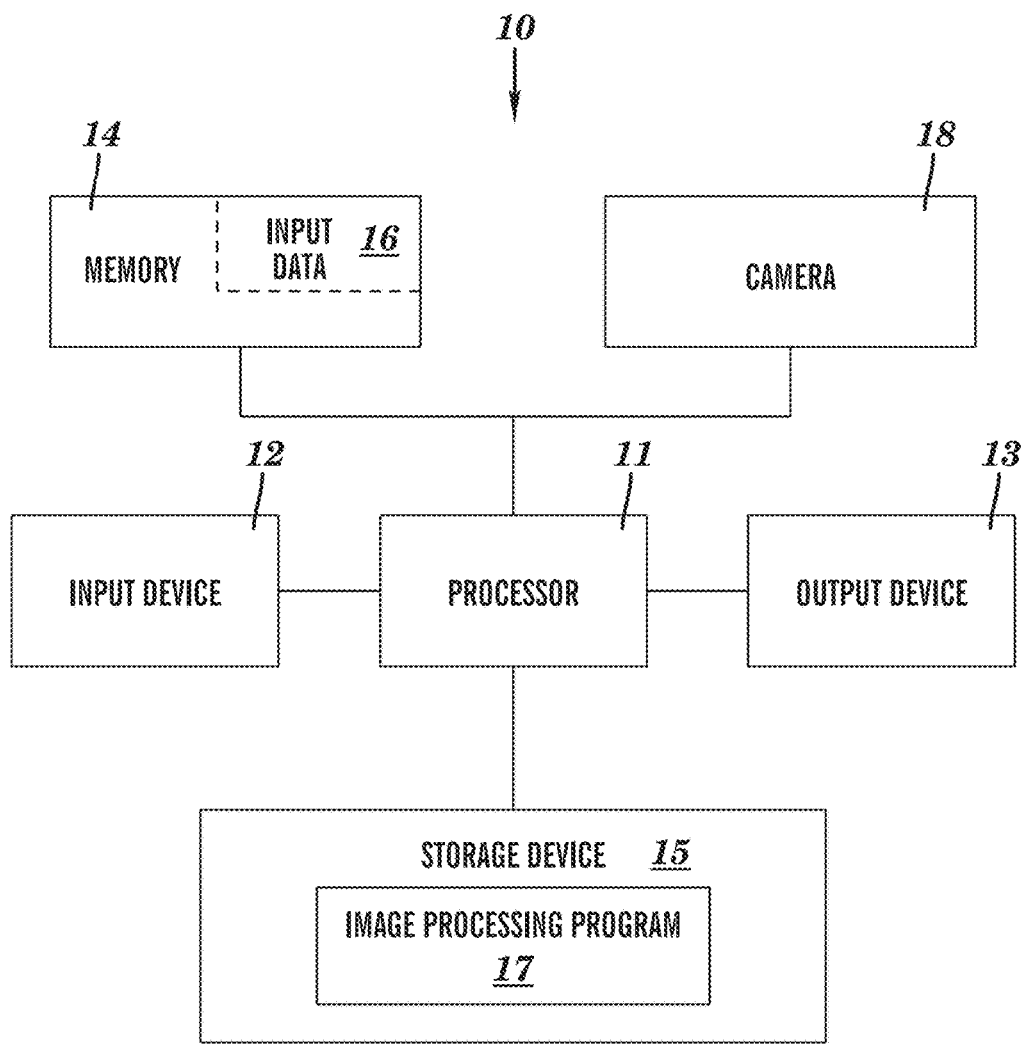
FIG. 1 depicts a computer system for processing light sources found in images, in accordance with embodiments of the present invention.

FIG. 1 depicts a computer system for processing light sources found in images, in accordance with embodiments of the present invention. The computer system 10 comprises a processor 11, an input device 12 coupled to the processor 11, an output device 13 coupled to the processor 11, a memory 14 coupled to the processor 11, and a storage device 15 each coupled to the processor 11. The input device 12 may be, inter alia, a keyboard, a mouse, etc. The output device 13 may be, inter alia, a printer, a plotter, a display device such as a computer screen, a magnetic tape, a removable hard disk, a floppy disk, etc. The memory 14 may be, inter alia, random access memory (RAM). The storage device 15 may be, inter alia, a hard disk, a floppy disk, a magnetic tape, an optical storage such as a compact disc (CD) or a digital video disc (DVD), etc. The storage device 15 stores computer programs, including image processing program 17, configured to be executed by the processor 11 via the memory 14 to process light sources found in images.

The processor 11 executes the image processing program 17. The memory 14 may store input data 16 required by the program 17. The output device 13 displays output from the program 17. The storage device 15 is a tangible computer readable storage device (such as a magnetic disk or semiconductor memory), or alternatively a plurality of tangible computer readable storage devices, storing the program 17 for execution by the processor 11, or alternatively by one or more processors (e.g., a plurality of processors), via the memory 14. Generally, the program 17 may be stored on a single storage device or may be stored by being distributed among a plurality of storage devices in any manner known in the art. A computer program product (or, alternatively, an article of manufacture) of the computer system 10 may comprise the storage device 15, or a plurality of storage devices, storing the program 17 for execution by the processor 11, or alternatively by a plurality of processors, via the memory 14. The term "computer readable storage device" does not mean a signal propagation medium such as a copper transmission cable, an optical transmission fiber, or a wireless transmission media.

FIG. 1 also depicts a camera 18 coupled to the computer system 10 by being coupled to the processor 11.

While FIG. 1 shows the computer system 10 as a particular configuration of hardware and software, any configuration of hardware and software, as would be known to a person of ordinary skill in the art, may be utilized for the purposes stated supra in conjunction with the particular computer system 10 of FIG. 1.

With the present invention, a camera takes multiple pictures (i.e., images represented as pixelated frames) of a scene, such as a room containing objects. There may be different lighting for the different pictures due to use of discrete light sources (e.g., artificial light sources) which change in the different images. The present invention includes software which identifies the discrete light sources in the different pictures and combines the discrete light sources to form a composite image. The software may also assign control regions to each of the discrete light sources in the composite image, wherein the control regions surround the respective discrete light sources in the composite image. The software enables a user to delete or modify the discrete light sources in the composite image via use of the control regions. In one embodiment, only those light sources in the composite image which are surrounded by a respective control region can be deleted or modified by the user.

Figure 2:
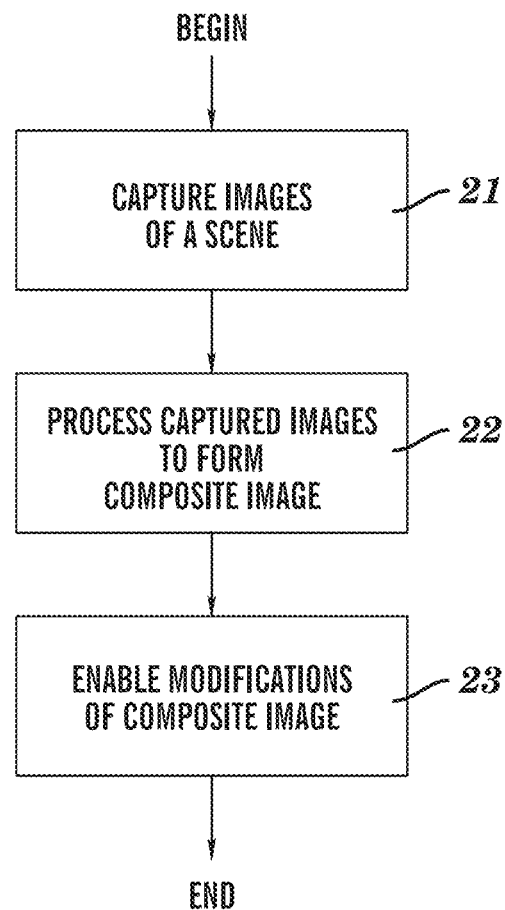
FIG. 2 is a flow chart of a method for processing images, in accordance with embodiments of the present invention.

FIG. 2 is a flow chart of a method for processing images, in accordance with embodiments of the present invention. The flow chart of FIG. 2 includes steps 21-23.

Figure 3:
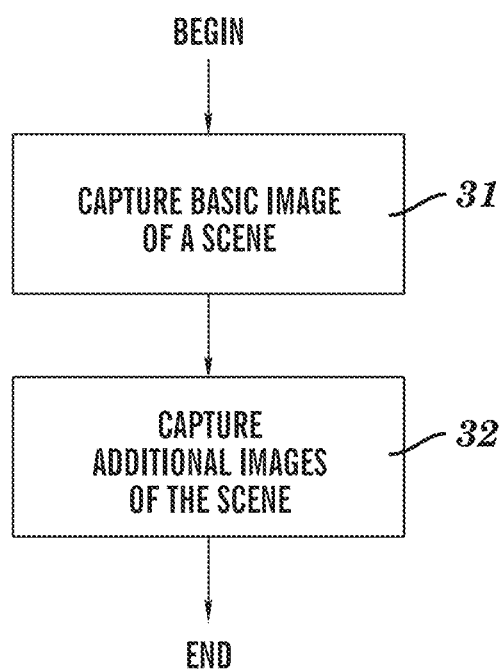
FIG. 3 is a flow chart of a process for capturing images, in accordance with embodiments of the present invention.

In step 21, the image processing program 17 captures images of a scene recorded in photographic images, namely pictures taken by a camera. The captured images include light sources. Each image is a frame of pixels. Each pixel comprises colored light characterized by optical parameters (e.g., three optical parameters in a red, green, blue (RGB) color scheme), such as, inter alia, hue (color), saturation (purity of color), and value (HSV), wherein value (V) may be exposure, intensity, luminance, brightness, etc. Each optical parameter has a value of 0, 1, . . . , or $2^n-1$ for a choice of a positive integer n which characterizes the numerical resolution at each pixel; e.g., n=3, 4, 5, 6, 7, 8, . . . with a corresponding maximum value of each optical parameter at each pixel of 7, 15, 31, 63, 127, 255, . . . , respectively. The integer n is called a resolution parameter, because the number of values of each optical parameter at each pixel, which is a measure of the numerical resolution of each optical parameter at each pixel, is a monotonically increasing function of n. FIG. 3 describes step 21 in more detail.

In step 22, the image processing program 17 processes the images captured in step 21 to form a composite image comprising the light sources in the images previously captured in step 21.

In step 23, the image processing program 17 enables modifications of the composite image previously formed in step 22. The modifications of the previously-formed composite image may include modifications of the light sources in the composite image as described infra in conjunction with FIGS. 9-16 and the description thereof.

FIG. 3 is a flow chart of the process of step 21 in FIG. 1 for capturing images of a scene, in accordance with embodiments of the present invention. The flow chart of FIG. 3 includes steps 31-32.

In step 31, the image processing program 17 captures a base image of a scene. The scene in the base image is exposed to ambient light. In one embodiment, the only light to which the base image is exposed is the ambient light. The ambient light may have sufficient spatial extent to be directed, with approximately equal light intensity, to the entire scene in the base image. In one embodiment, the ambient light may be a natural light source such as, liter alia, sunlight, which is directed, with approximately equal light intensity, to the entire scene in the base image. In one embodiment, the ambient light may be an artificial light source (e.g., a flood light) having sufficient spatial extent to be directed, with approximately equal light intensity, to the entire scene in the base image.

In step 32, the image processing program 17 captures N additional images of the scene, wherein N is at least 2. In practice, the camera 18 captures K successive images of which N images are selected (N≤K) and K−N images are discarded (e.g., images selected and discarded by the user). The N selected images are the N additional images captured by the image processing program 17 and subsequently combined with the base image to form the composite image. The scene of the base image is exposed, in each of the N additional images, to the ambient light and to at least one discrete light source. At least one discrete light source in each of the N additional images may independently be a fluorescent light source, an incandescent light source, a light emitting diode (LED), a strobe light, etc.

Any or all additional images of the N additional images may be modified (e.g., by the user) by any known method of image modification such as by use of a traditional "Photoshop" mask, either (i) after the N additional images are selected from the K images and before the composite image is formed, or (ii) after the composite image is formed. In the latter embodiment (i.e., after the composite image is formed), the process of forming the composite image in step 22 of FIG. 2 is repeated using the additional images that have been modified.

Figure 4:
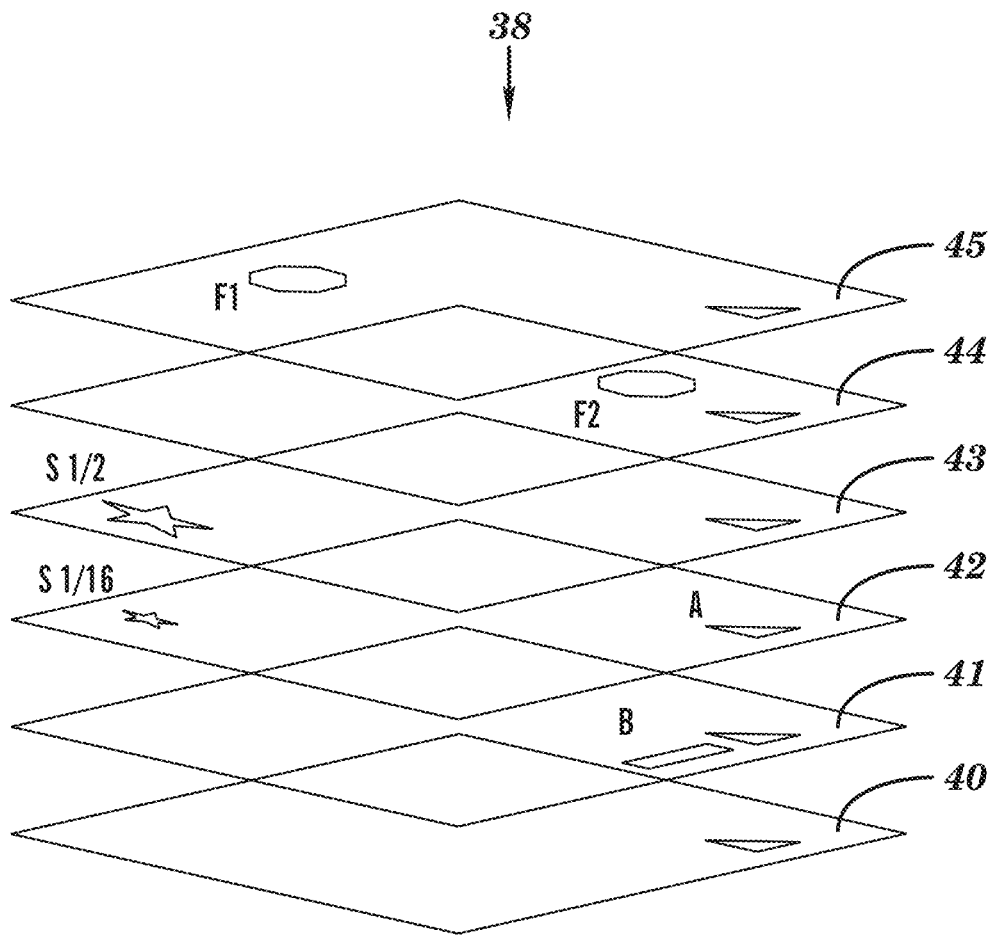
FIG. 4 depicts a stack of the images captured via the process of FIG. 3, in accordance with embodiments of the present invention.

FIG. 4 depicts a stack 38 of the images captured via the process of FIG. 3, in accordance with embodiments of the present invention. The stack 38 includes the base image 40 and the N additional images 41-45 (i.e., N=5). The base image 40 is exposed to the ambient light. The five additional images 41-45 are exposed to the ambient light and discrete light sources A, B, F, and S which have been selectively turned on and off in different images. A control region may surround one or more of each discrete light source as described infra in conjunction with FIG. 7.

The stack of FIG. 4 may be formed as a stack of N+1 images comprising the N additional images on top of the base image such that all corresponding pixels in each pair of successive images in the stack are geometrically aligned with respect to the corresponding pixels in the base image.

Light source A is fixed and does not vary across all five images 41-45. A control region could be assigned to light source A based on increased luminosity of light source A in relation to the images 41-45 that include the light source A.

Light source B is turned on for image 41 and turned off for images 42-45. A control region may be assigned to light source B.

Light source F is physically moved from one spatial location in image 44 (where F is denoted as light source F2) to another spatial location in image 45 (where F is denoted as light source F1), with the same light intensity for F1 and F2 in images 44 and 45, respectively. A control region may be assigned to light source F for each of F1 and F2.

Light source S is triggered for images 42 and 43 at $1/16$ power and ½ power, respectively; i.e., light source S is capable of emitting light at different powers including $1/16$ power and ½ power in the example of FIG. 4. One control region may be assigned to light source S at the two powers. Rather than simulating the result of increased and decreased intensity of a light source, the actual change of intensity of the light source will usually produce a superior result. Combining the two powers in one control region allows simpler control which facilitates quick and easy cycling of intensities without physically choosing each frame, examining each power independently, and creating independent masks pertaining to each power (see step 51 in FIG. 5 for discussion of masks). See one control region 65 surrounding the light source S at both $1/16$ power and ½ power in FIG. 7.

Figure 5:
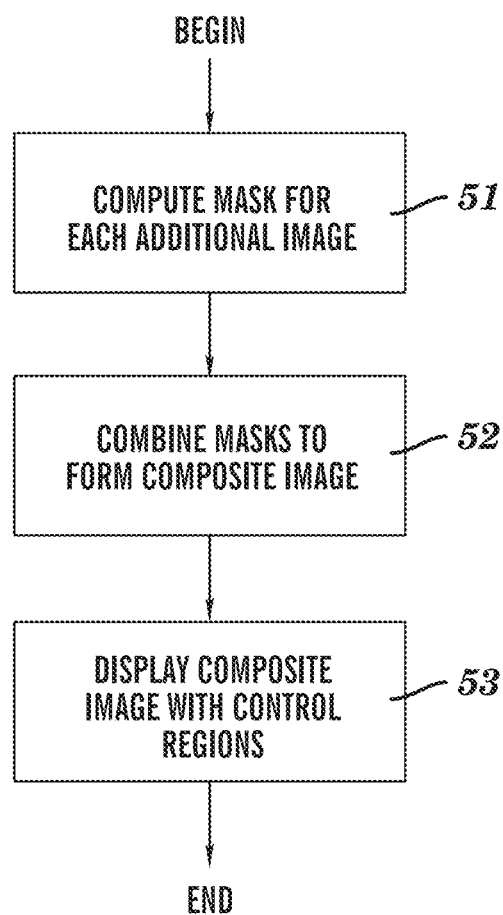
FIG. 5 is a flow chart of a process for processing the stack of images of FIG. 4 to form and display a composite image comprising discrete light sources, in accordance with embodiments of the present invention.

FIG. 5 is a flow chart of a process for processing the stack of images of FIG. 4 to form and display a composite image comprising discrete light sources, in accordance with embodiments of the present invention. The flow chart of FIG. 5 includes steps 51-53.

In step 51, the image processing program 17 computes a multi-value mask for each of the N additional images (e.g., each of the five additional images 41-45 of FIG. 4). The multi-value mask for a given additional image is defined to be a frame of pixels with a vector of multiple optical parameter values at each pixel. Thus, the word "mask" is used herein to mean multi-value mask as previously defined. The values of the optical parameters at the pixels of the mask of a given additional image are computed by subtracting the value of the optical parameters at each pixel of the base image from the value of the optical parameters at each corresponding pixel of the given additional image. For example, consider a given additional image having three optical parameter values of (20, 20, 50) at a given pixel, and the base image having three optical parameter values of (15, 20, 40) at a pixel corresponding to the given pixel. Then the corresponding three optical parameter values at a pixel of the mask associated with the given additional image is (5, 0, 10) as computed by the preceding subtraction process. Thus, the multiple optical parameter values at each pixel are three optical parameter values at each pixel for the multi-value mask in the preceding example.

In one embodiment, each light source in each mask is subject to satisfying a tolerance test of requiring each optical parameter value to satisfy the following tolerance test: if the computed difference between an optical parameter value at a given pixel of given additional image and the optical parameter value at the corresponding pixel of the base image is less than a specified tolerance, then this difference is replaced by zero. For example if the specified tolerance is 3 and the computed difference is 2, then the computed difference of 2 is replaced by zero.

In one embodiment, the preceding tolerance pertaining to the computed difference (i.e., between an optical parameter value at a given pixel of a given additional image and the optical parameter value at the corresponding pixel of the base image) could be used as another "slider" control (see FIG. 16 and accompanying description) which may have an effect of narrowing or broadening the "spot"; i.e., zooming the light source, resulting in, for example, one slider" for intensity of the light and another "slider" for adjusting between spot and flood.

In step 52, the image processing program 17 combines the masks computed in step 21 of FIG. 2 for each of the N additional images to form a composite image. The masks are combined by adding the optical parameter values of corresponding pixels in the N masks, subject to not exceeding the maximum magnitude ($2^n-1$) of at any optical parameter value for a given resolution parameter n. For example if n=7, the maximum allowable optical parameter value is 127 (i.e., $2^7-1$). Thus, for optical parameter values of 0, 10, 0, 0, and 40 at corresponding pixels of the masks respectively associated with the additional images 41, 42, 43, 44, and 45 of FIG. 4, the optical parameter value at the corresponding pixel in the composite image is 50 (i.e., 0+10+0+0+40)

which is less than the maximum allowable optical parameter value of 127. On the other hand, for optical parameter values of 0, 40, 30, 0, and 60 at corresponding pixels of the masks associated with the additional images 41-45 of FIG. 4, the optical parameter value at the corresponding pixel in the composite image is truncated to 127 because the summation of 0+40+30+0+30) is 130 which exceeds the maximum allowable optical parameter value of 127.

Thus in steps 51 and 52 collectively, the image processing program 17 combines the base photographic image of the scene with the N additional photographic images of the scene to form the composite image comprising M discrete light sources, wherein the scene in the base image is exposed to ambient light. The scene of the base image is exposed, in each of the N additional images, to the ambient light and to at least one discrete light source to which the base image is not exposed. The M discrete light sources in the composite image include the discrete light sources to which the scene is exposed in the N additional images. In one embodiment, N is at least 2, and M is at least N.

In step 53, the image processing program 17 displays the composite image on a display device of the computer system 10 of FIG. 1. In one embodiment, the displayed composite image may depict a region surrounding each discrete light source and having an area that correlates with an intensity of light emitted by the discrete light source surrounded by the region. In one embodiment, each discrete light source in the displayed composite image may be presented visually on the display device in accordance with a value of the first, second, and third optical parameter (e.g., hue, saturation, and exposure).

Figure 6:
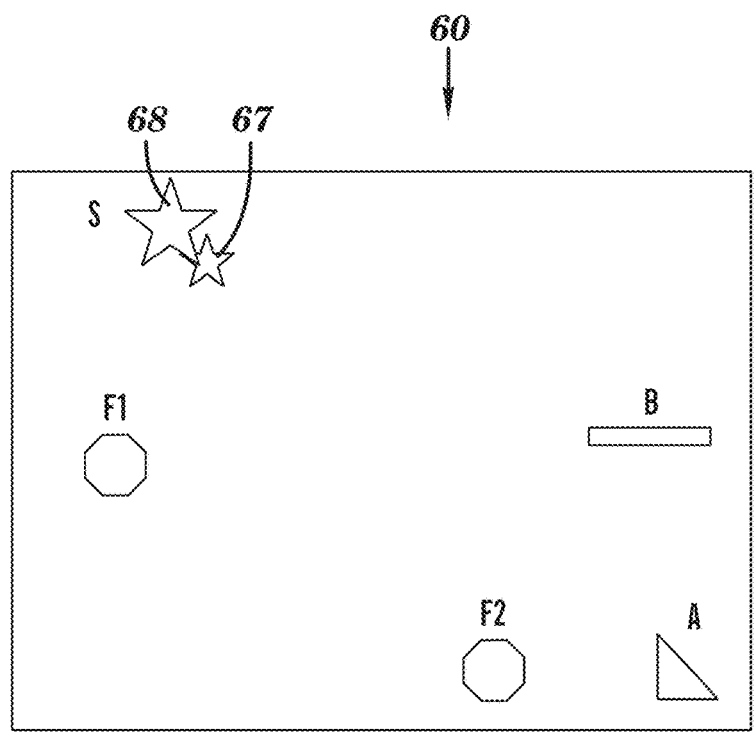
FIG. 6 is a pictorial illustration of the composite image formed from the stack of images of FIG. 4 via the process of FIG. 5, in accordance with embodiments of the present invention.

FIG. 6 is a pictorial illustration of the composite image 60 formed from the stack of images of FIG. 4 via the process of FIG. 5, in accordance with embodiments of the present invention. The light source S in FIG. 4 for images 42 and 43 is at $1/16$ power and $1/2$ power, respectively. Since FIG. 6 is a composite image, however, the light source S is at a single power in FIG. 6, which in one embodiment, is either $1/16$ power and $1/2$ power as respectively represented reference numerals 67 and 68, because light source S is capable of emitting light at different powers including $1/16$ power and $1/2$ power. In one embodiment, the single power of S in the composite image may be an average power as discussed infra in conjunction with FIG. 8B.

Figure 7:
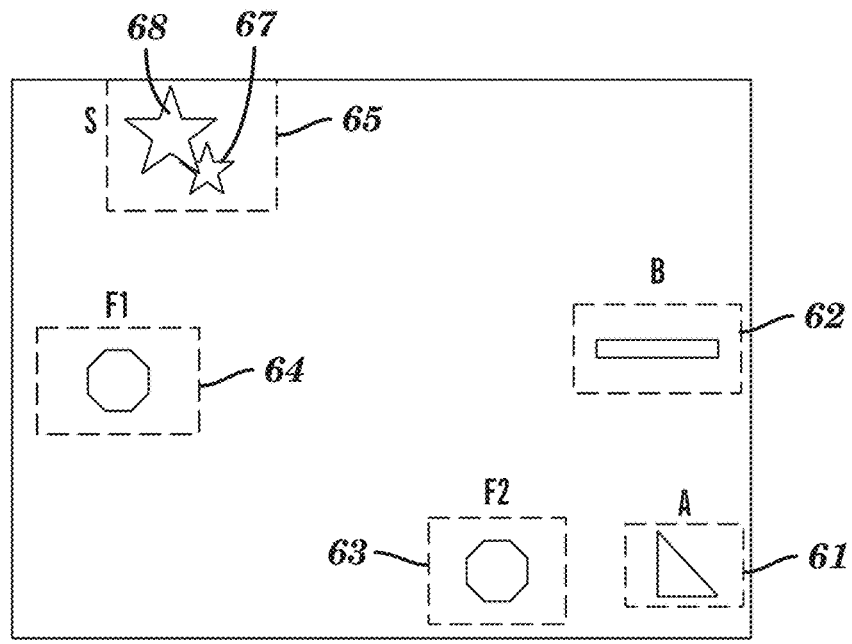
FIG. 7 depicts the composite image of FIG. 6 with a control region surrounding each discrete light source, in accordance with embodiments of the present invention.

FIG. 7 depicts the composite image 60 of FIG. 6 with a control region surrounding each discrete light source, in accordance with embodiments of the present invention. More specifically, the control regions 61, 62, 63, 64, and 65 surround light sources, A, S, F2, F1, and S, respectively. The control region 65 surrounds the light source S at both $1/16$ power and $1/2$ power (see FIG. 4).

Figure 8A:
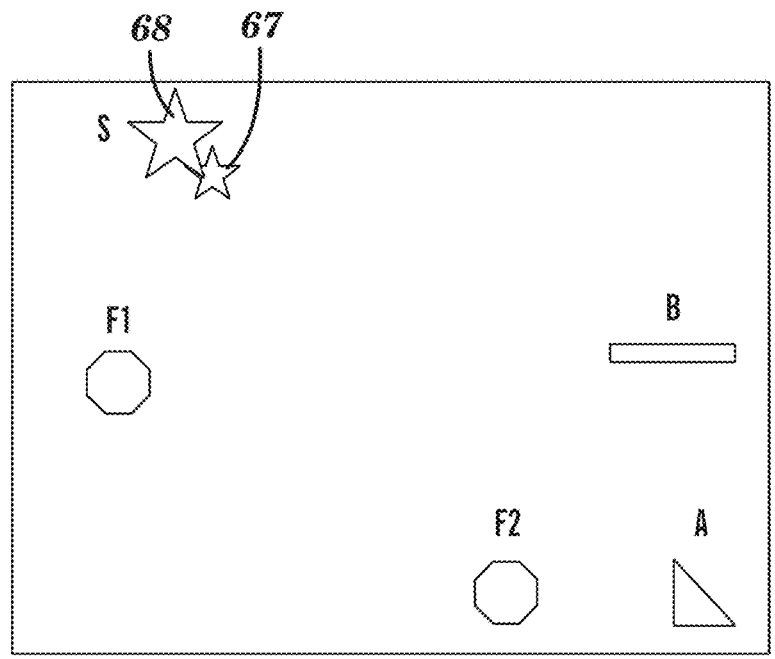
FIG. 8A depicts the composite image of FIG. 6 showing a discrete light source having different intensities, in accordance with embodiments of the present invention.

FIG. 8A depicts the composite image of FIG. 6 showing the discrete light source S having different intensities, in accordance with embodiments of the present invention. The light source S in FIG. 8A depict S represented by reference numerals 67 and 68 at $1/16$ power and $1/2$ power, respectively.

Figure 8B:
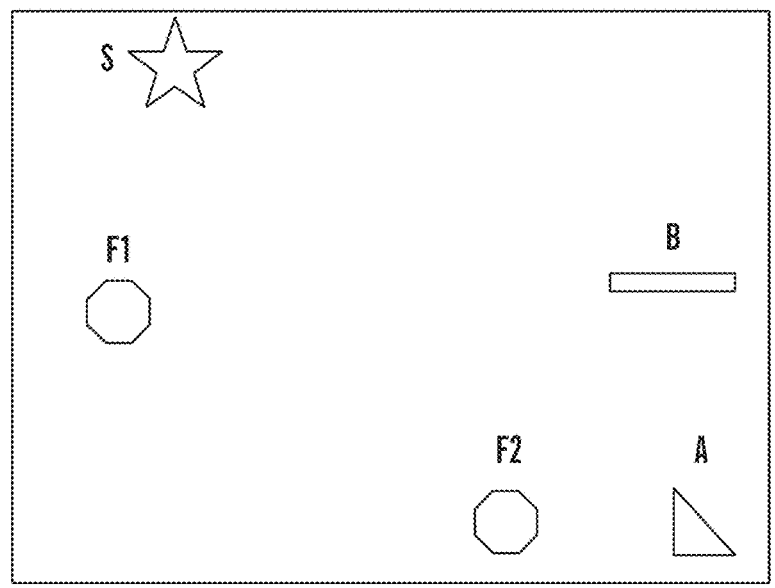
FIG. 8B depicts the composite image of FIG. 8A showing the discrete light source having an average intensity, in accordance with embodiments of the present invention.

FIG. 8B depicts the composite image of FIG. 8A showing the discrete light source having an average intensity, in accordance with embodiments of the present invention. For the example of FIG. 8A, the arithmetic average of $1/16$ power and $1/2$ power is $9/16$ power.

Figure 9A:
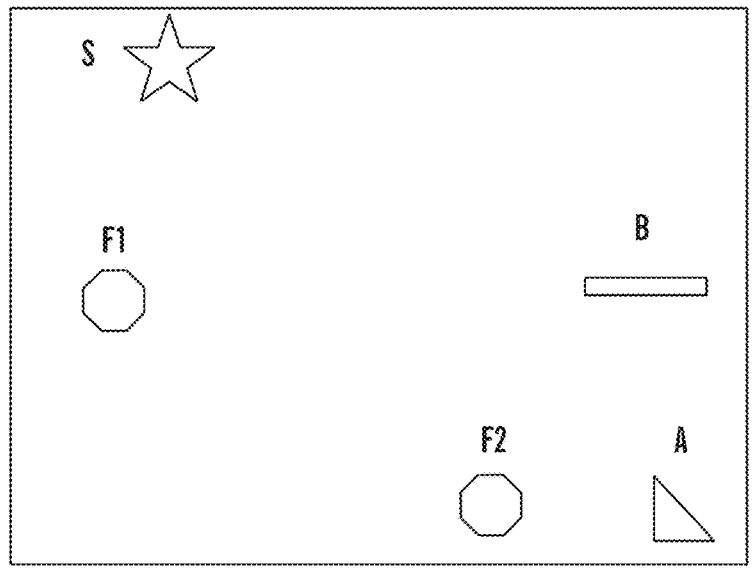
FIGS. 9A and 9B depict the composite image of FIG. 6 having a discrete light source transitioned from a higher intensity (FIG. 9A) to a lower intensity (FIG. 9B), in accordance with embodiments of the present invention.
Figure 9B:
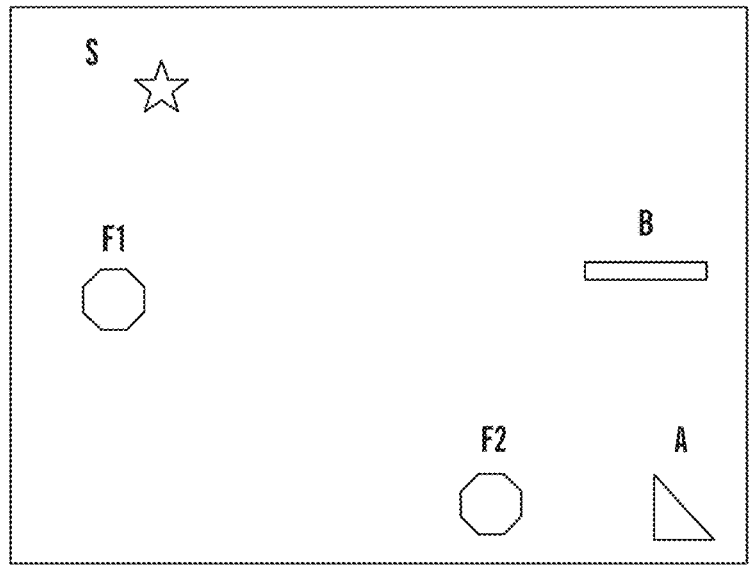

FIGS. 9A and 9B (collectively, "FIG. 9") depict the composite image of FIG. 6 having a discrete light source transitioned from a higher intensity (FIG. 9A) to a lower intensity (FIG. 9B), in accordance with embodiments of the present invention. The higher intensity of S in FIG. 9A is derived from $1/2$ power and the lower intensity of S in FIG. 9B is derived from $1/16$ power.

Figure 10A:
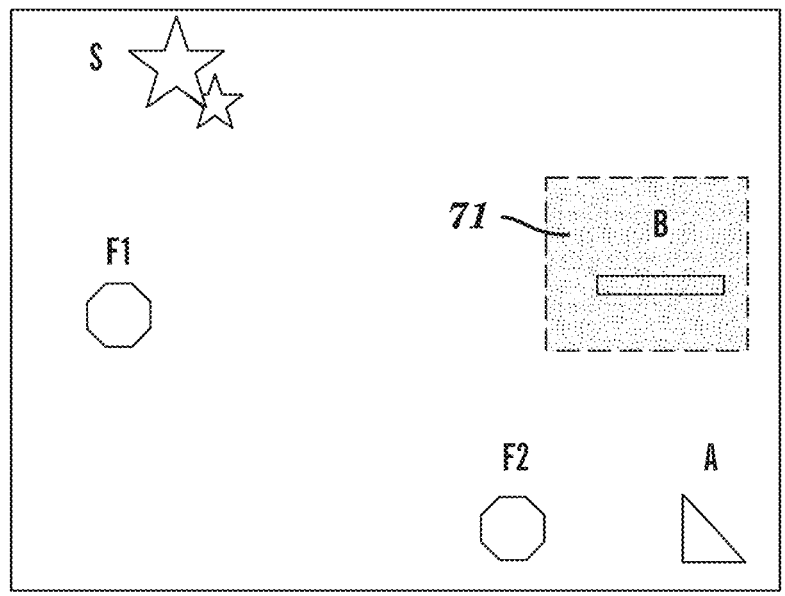
FIGS. 10A and 10B depict the composite image of FIG. 6 with FIG. 10A showing a control region surrounding a discrete light source and FIG. 10B showing an absence of the discrete light source surrounded by the control region in FIG. 10A, in accordance with embodiments of the present invention.
Figure 10B:
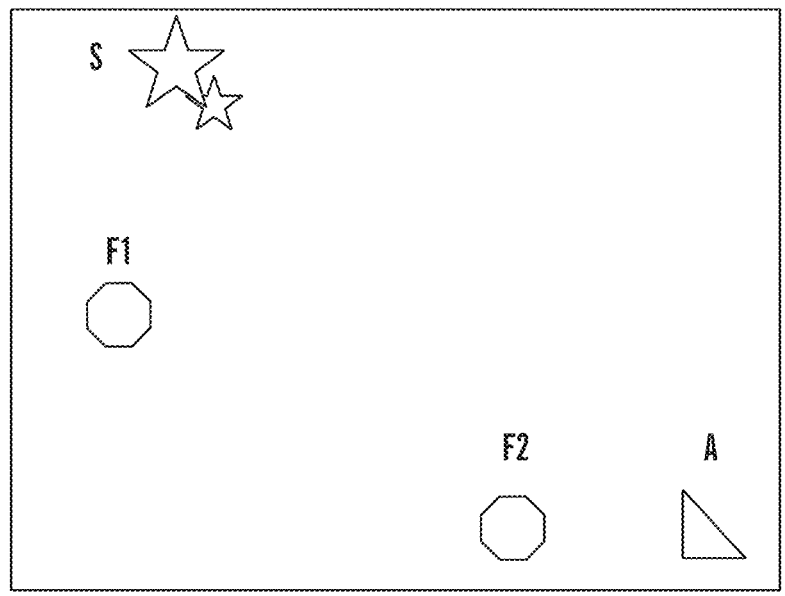

FIGS. 10A and 10B (collectively, "FIG. 10") depict the composite image of FIG. 6 with FIG. 10A showing a control region 71 surrounding the discrete light source B and FIG. 10B showing an absence of the discrete light source B, in accordance with embodiments of the present invention. Thus, the discrete light source B in FIG. 10A has been deleted and thus does not appear in FIG. 10B.

Figure 11A:
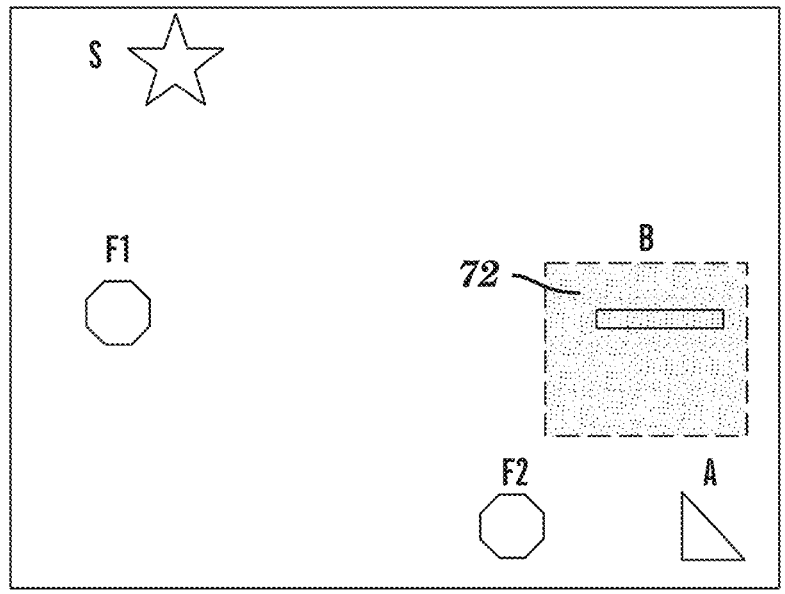
FIGS. 11A and 11B depict the composite image of FIG. 8B with FIG. 11A showing a control region surrounding a discrete light source and FIG. 11B showing an absence of the discrete light source surrounded by the control region in FIG. 11A, in accordance with embodiments of the present invention.
Figure 11B:
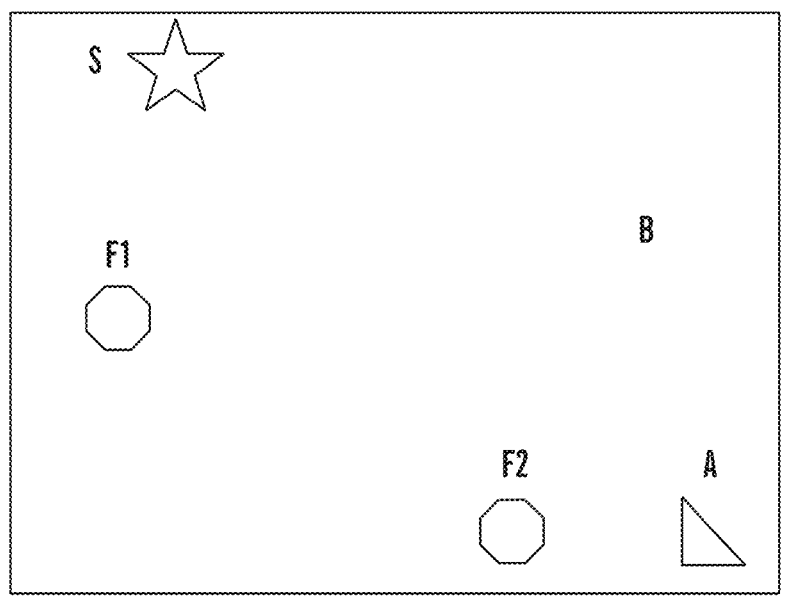

FIGS. 11A and 11B (collectively, "FIG. 11") depict the composite image of FIG. 8B with FIG. 11A showing a control region 72 surrounding the discrete light source B and FIG. 11B showing an absence of the discrete light source B, in accordance with embodiments of the present invention. Thus, the discrete light source B in FIG. 11A has been deleted and thus does not appear in FIG. 11B.

Figure 12A:
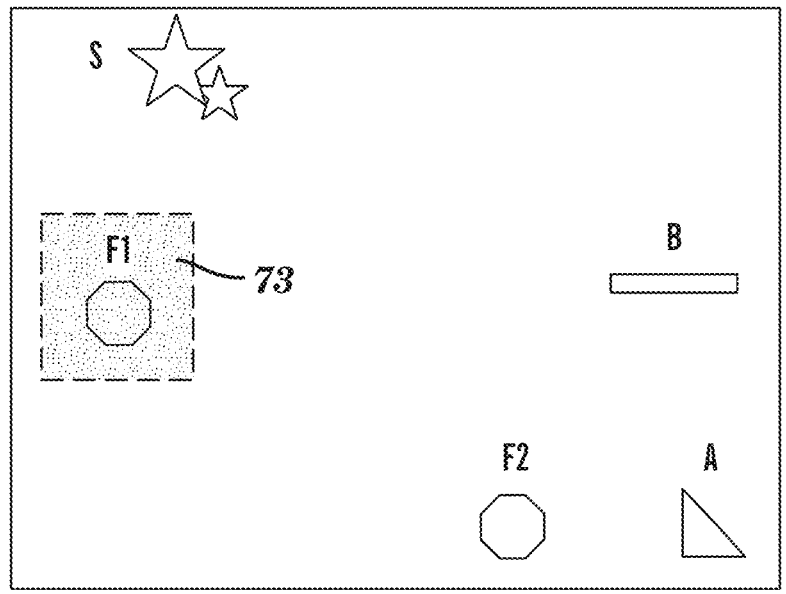
FIGS. 12A and 12B depict the composite image of FIG. 6 with FIG. 12A showing a control region surrounding a discrete light source and FIG. 12B showing an enlargement of the control region surrounding the discrete light source, in accordance with embodiments of the present invention.
Figure 12B:
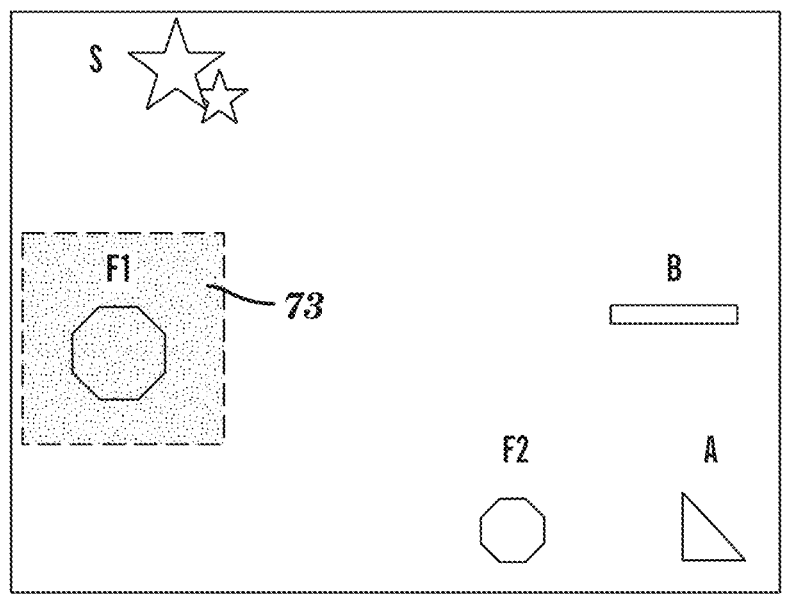

FIGS. 12A and 12B (collectively, "FIG. 12") depict the composite image of FIG. 6 with FIG. 12A showing a control region 73 surrounding the discrete light source F1 and FIG. 12B showing an enlargement of the control region 73 surrounding the discrete light source F1, in accordance with embodiments of the present invention. Thus, the area of the control region 73 surrounding the discrete light source F1 in FIG. 12A has been enlarged and thus appears enlarged in FIG. 12B. In one embodiment, enlarging the area of the control region 73 may be in in response to receiving an instruction to increase the intensity of light emitted by the discrete light source F1, because the intensity of light emitted by the discrete light source F1 may be a monotonically increasing function of (e.g., linearly proportional to) the area of the control region 73.

Figure 13A:
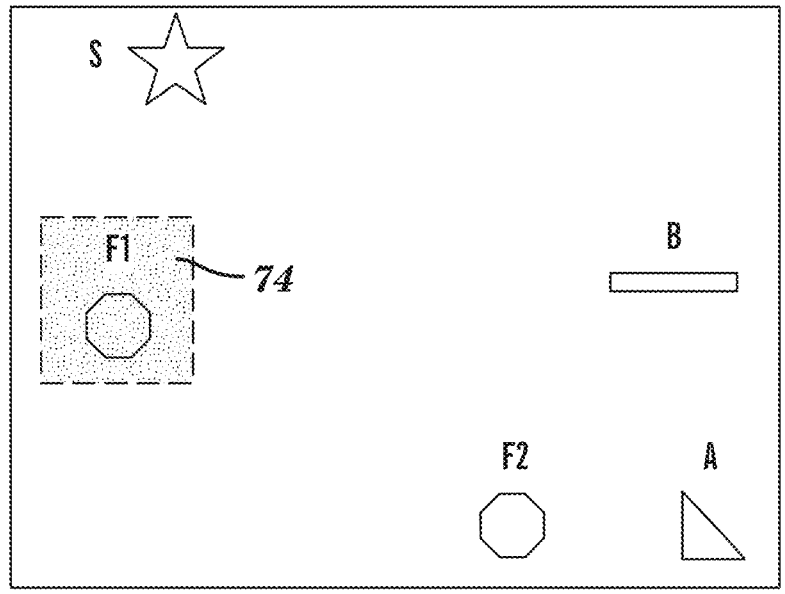
FIGS. 13A and 13B depict the composite image of FIG. 8B with FIG. 13A showing a control region surrounding a discrete light source and FIG. 13B showing an enlargement of the control region surrounding the discrete light source, in accordance with embodiments of the present invention.
Figure 13B:
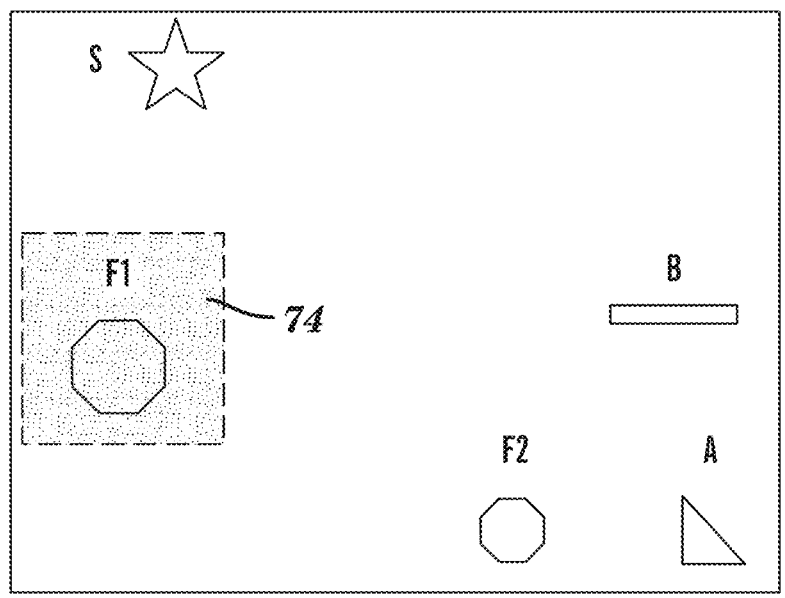

FIGS. 13A and 13B (collectively, "FIG. 13") depict the composite image of FIG. 8B with FIG. 13A showing a control region 74 surrounding the discrete light source F1 and FIG. 13B showing an enlargement of the control region 74 surrounding the discrete light source F1, in accordance with embodiments of the present invention. Thus, the area of the control region 74 surrounding the discrete light source F1 in FIG. 13A has been enlarged and thus appears enlarged in FIG. 13B. In one embodiment, enlarging the area of the control region 74 may be in in response to receiving an instruction to increase the intensity of light emitted by the discrete light source F1, because the intensity of light emitted by the discrete light source F1 may be a monotonically increasing function of (e.g., linearly proportional to) the area of the control region 74.

In addition to being used to delete discrete light sources and to enlarge control regions, the control regions may be used to: (i) blend control regions into a draft composite image in varying degrees, using different blend modes; (ii) change the color temperature of the control region's lit area (e.g., apparent white balance of the light source, by changing between yellow and blue, between green and red, etc.); and (iii) change the hue, tone, contrast, saturation, and other image adjustment factors for a control region or a group of control regions.

Figure 14:
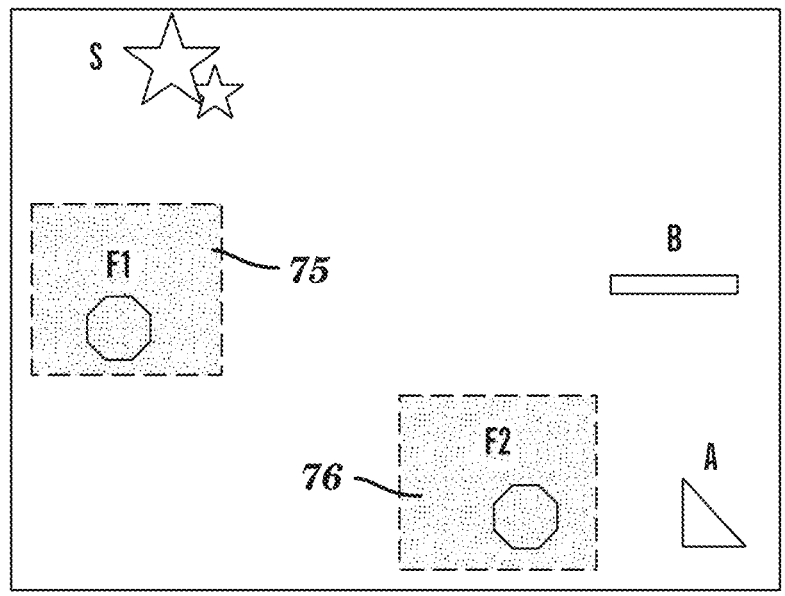
FIG. 14 depicts the composite image of FIG. 6 showing a group of control regions surrounding respective discrete light sources, in accordance with embodiments of the present invention.

FIG. 14 depicts the composite image of FIG. 6 showing a group of control regions 75 and 76 surrounding respective discrete light sources F1 and F2, in accordance with embodiments of the present invention. In FIG. 14, the group of control regions 75 and 76 enable any action by the user to delete or modify optical parameters to apply to all light sources (F1 and F2) within the group of control regions (75 and 76).

Figure 15:
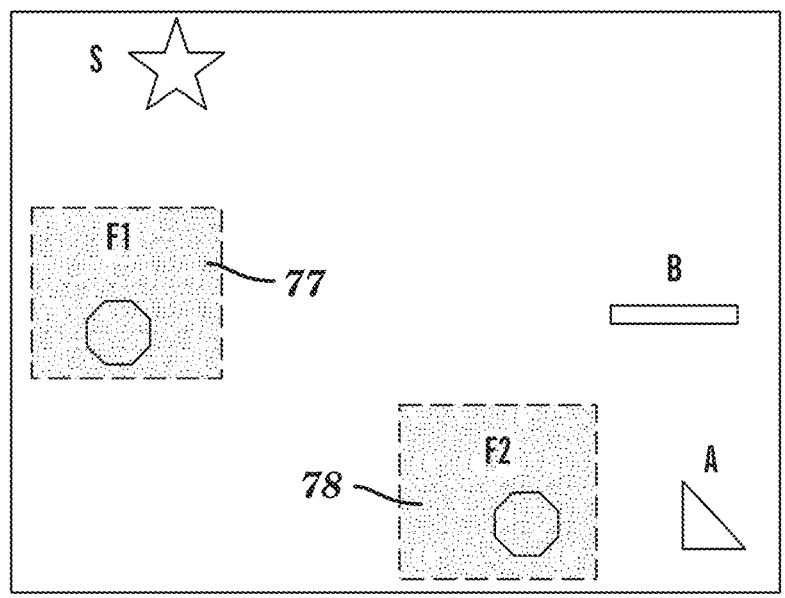
FIG. 15 depicts the composite image of FIG. 8B showing a group of control regions surrounding respective discrete light sources, in accordance with embodiments of the present invention.

FIG. 15 depicts the composite image of FIG. 8B showing a group of control regions 77 and 78 surrounding respective discrete light sources F and F2, in accordance with embodiments of the present invention. In FIG. 15, the group of control regions 77 and 78 enable any action by the user to delete or modify optical parameters to apply to all light sources (F1 and F2) within the group of control regions (77 and 78).

The image processing program 17 determines various properties of identified control regions and gives the user an option to group the control regions based on similarities among the control regions, such as: time of capture of images, proximity of control regions to each other, reflections of light, color casts, and color temperature of high-tone areas presumably exposed to the same type of light source.

Figure 16:
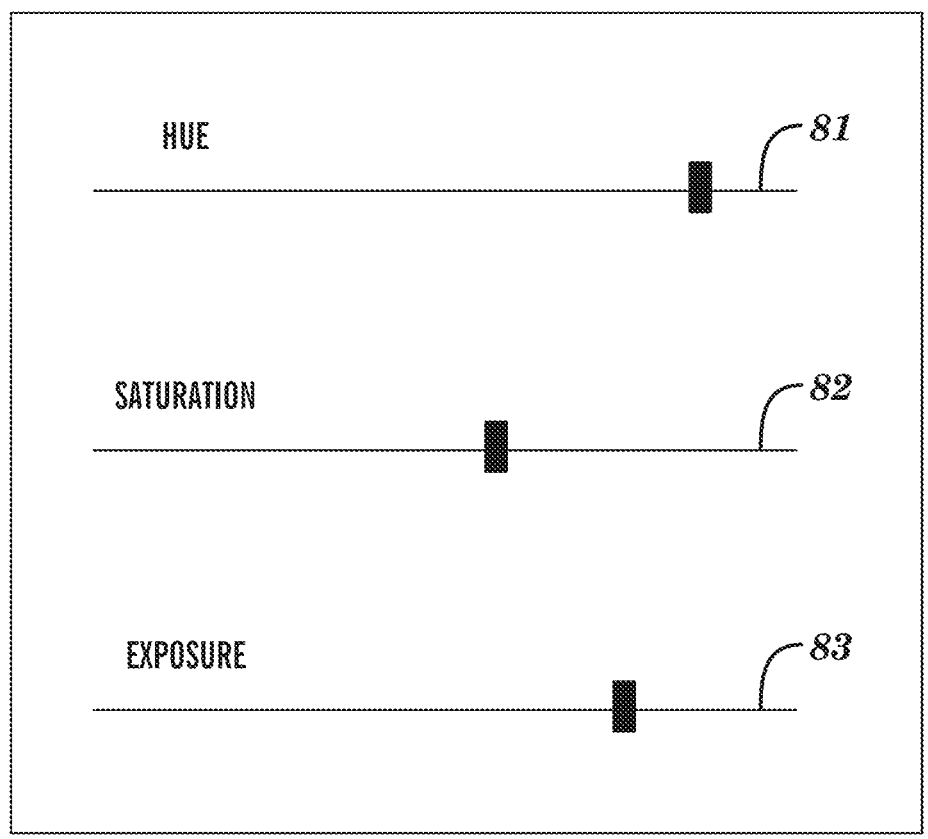
FIG. 16 depicts control objects for enabling a user to change optical parameters of discrete light sources in a composite image, in accordance with embodiments of the present invention.

FIG. 16 depicts control objects 81, 82, and 83 for enabling a user to change the optical parameters of hue, saturation, and exposure, respectively, of discrete light sources in a composite image, in accordance with embodiments of the present invention. The control objects 81, 82, and 83 in FIG. 16 are sliders. Generally, the control objects of the present invention may be any control objects known in the art for changing the value of a parameter, (e.g., sliders, rotary dials, etc.). The optical parameters may be changed by the user for those light sources in the composite frame which are surrounded by control boxes. Although FIG. 16 depicts the optical parameters of hue, saturation, and exposure, the optical parameters that may be changed by the user may be any of the optical parameters discussed supra.

In one embodiment, a selection of one discrete light source in the displayed composite image is received and in response, first, second, and third control objects are displayed on the display device and are configured to be manipulated by a user at the display device to change the first, second, and third optical parameter, respectively, of the selected one discrete light source.

In one embodiment, criteria for grouping discrete light sources in the displayed composite image are received and in response, a group of two or more discrete light sources in the displayed composite image that satisfy the criteria is formed and displayed on the display device. Then, first, second, and third control objects are displayed on the display device and are configured to be manipulated by a user at the display to concurrently change the first, second, and third optical parameter, respectively, of each discrete light source in the group.

Modifications of lighting in the composite image, as described supra in conjunction with claims 9-16, may be saved for later use.

Figure 17:
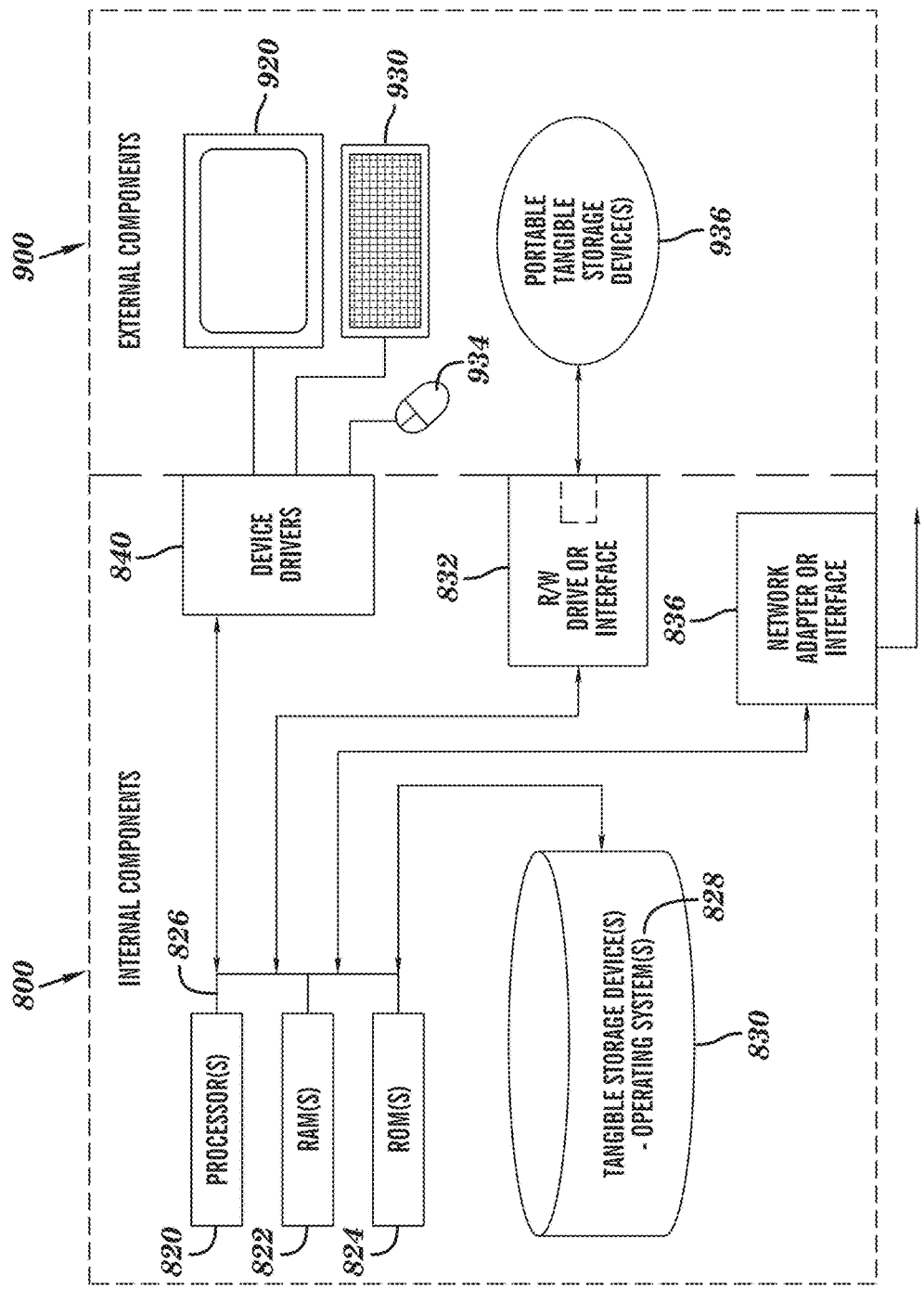
FIG. 17 illustrates a computer apparatus used by the computer system of FIG. 1 for processing light sources found in images, in accordance with embodiments of the present invention.

FIG. 17 illustrates a computer apparatus used by the computer system 10 of FIG. 1 for processing light sources found in images, in accordance with embodiments of the present invention. The computer apparatus of FIG. 17 includes a set of internal components 800 and external components 900. The set of internal components 800 includes one or more processors 820, one or more computer-readable RAMs 822 and one or more computer-readable ROMs 824 on one or more buses 826, one or more operating systems 828 and one or more computer-readable storage devices 830. The one or more operating systems 828 and program instructions for programs 17 (see FIG. 1) are stored on one or more of the respective computer-readable storage devices 830 for execution by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

The set of internal components 800 also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. The program instructions for programs 17-19 can be stored on one or more of the respective portable computer-readable storage devices 936, read via the respective R/W drive or interface 832 and loaded into the respective hard drive or semiconductor storage device 830. The term "computer-readable storage device" does not encompass signal propagation media such as copper transmission cables, optical transmission fibers and wireless transmission media.

The set of internal components 800 also includes a network adapter or interface 836 such as a TCP/IP adapter card or wireless communication adapter (such as a 4G wireless communication adapter using OFDMA technology). The programs instructions for programs 17-19 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

The set of external components 900 includes a display screen (i.e., touch screen) 920, a keyboard or keypad 930, and a computer mouse or touchpad 940. The sets of internal components 800 also includes device drivers 840 to interface to display screen 920 for imaging, to keyboard or keypad 930, to computer mouse or touchpad 940, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing light sources, said method comprising:

combining, by one or more processors, a base image of a scene with N additional images of the scene to form a composite image comprising M discrete light sources, wherein the scene in the base image is exposed to ambient light, wherein the scene of the base image is exposed, in each of the N additional images, to the ambient light and to at least one discrete light source to which the base image is not exposed, wherein the M discrete light sources in the composite image include the discrete light sources to which the scene is exposed in the N additional images, wherein N is at least 2, and wherein M is at least N; and displaying, by the one or more processors, the composite image on a display device, wherein the displayed composite image depicts a region surrounding each discrete light source and having an area that correlates with an intensity of light emitted by the discrete light source surrounded by the region, wherein the intensity of light is the intensity at the discrete light source where the light is emitted.

2. The method of claim 1, wherein the base image and the N additional images are photographic images.

3. The method of claim 1, wherein each region is specific to and different for each individual light source surrounded by said each region.

4. The method of claim 1, where said combining comprises:

computing a mask of each additional image to form N masks by computing a difference between an intensity of light at each pixel of each additional image and the intensity of light at a corresponding pixel of the base image; and combining the N masks to form the composite image.

5. The method of claim 1, wherein the method further comprises:

forming, by the one or more processors, a stack of N+1 images comprising the N additional images on top of the base image such that all corresponding pixels in each pair of successive images in the stack are geometrically aligned; and displaying, by the one or more processors, the stack of N+1 images on the display device.

6. The method of claim 1, wherein the method further comprises:

deleting, by the one or more processors, one discrete light source from the displayed composite image.

7. The method of claim 1, wherein the method further comprises:

enlarging, by the one or more processors, the area of the region surrounding one discrete light source in the displayed composite image in response to receiving an instruction to increase the intensity of light emitted by the one discrete light source.

8. The method of claim 1, wherein each discrete light source in the displayed composite image is presented visually on the display device in accordance with a value of a first, second, and third optical parameter.

9. The method of claim 8, wherein the method further comprises:

receiving, by the one or more processors, a selection of one discrete light source in the displayed composite image and in response, displaying on the display device a first, second, and third control object configured to be manipulated by a user at the display device to change the first, second, and third optical parameter, respectively, of the selected one discrete light source.

10. The method of claim 8, wherein the method further comprises:

receiving, by the one or more processors, criteria for grouping discrete light sources in the displayed composite image and in response, forming a group of two or more discrete light sources in the displayed composite image that satisfy the criteria and displaying on the display device a first, second, and third control object configured to be manipulated by a user at the display device to concurrently change the first, second, and third optical parameter, respectively, of each discrete light source in the group.

11. A computer program product, comprising one or more computer readable hardware storage devices having computer readable program code stored therein, said program code containing instructions executable by one or more processors of a computer system to implement a method for processing light sources, said method comprising:

combining, by the one or more processors, a base image of a scene with N additional images of the scene to form a composite image comprising M discrete light sources, wherein the scene in the base image is exposed to ambient light, wherein the scene of the base image is exposed, in each of the N additional images, to the ambient light and to at least one discrete light source to which the base image is not exposed, wherein the M discrete light sources in the composite image include the discrete light sources to which the scene is exposed in the N additional images, wherein N is at least 2, and wherein M is at least N; and displaying, by the one or more processors, the composite image on a display device, wherein the displayed composite image depicts a region surrounding each discrete light source and having an area that correlates with an intensity of light emitted by the discrete light source surrounded by the region, wherein the intensity of light is the intensity at the discrete light source where the light is emitted.

12. The computer program product of claim 11, wherein the base image and the N additional images are photographic images.

13. The computer program product of claim 11, wherein each region is specific to and different for each individual light source surrounded by said each region.

14. The computer program product of claim 11, where said combining comprises:

computing a mask of each additional image to form N masks by computing a difference between an intensity of light at each pixel of each additional image and the intensity of light at a corresponding pixel of the base image; and combining the N masks to form the composite image.

15. A computer system, comprising one or more processors, one or more memories, and one or more computer readable hardware storage devices, said one or more hardware storage device containing program code executable by the one or more processors via the one or more memories to implement a method for processing light sources, said method comprising:

combining, by the one or more processors, a base image of a scene with N additional images of the scene to form a composite image comprising M discrete light sources, wherein the scene in the base image is exposed to ambient light, wherein the scene of the base image is exposed, in each of the N additional images, to the ambient light and to at least one discrete light source to which the base image is not exposed, wherein the M discrete light sources in the composite image include the discrete light sources to which the scene is exposed in the N additional images, wherein N is at least 2, and wherein M is at least N; and displaying, by the one or more processors, the composite image on a display device, wherein the displayed composite image depicts a region surrounding each discrete light source and having an area that correlates with an intensity of light emitted by the discrete light source surrounded by the region, wherein the intensity of light is the intensity at the discrete light source where the light is emitted.

16. The computer system of claim 15, wherein the base image and the N additional images are photographic images.

17. The computer system of claim 15, wherein each region is specific to and different for each individual light source surrounded by said each region.

* * * * *